(12) United States Patent
Bondet

(10) Patent No.: US 7,695,133 B2
(45) Date of Patent: Apr. 13, 2010

(54) PAIR OF SPECTACLES WITH INTERCHANGEABLE LENSES

(76) Inventor: Pierre Bondet, 441 Rue Richard Wagner, Veyziat (FR) F-01100

( * ) Notice: Subject to any disclaimer, the term of this patent is extended or adjusted under 35 U.S.C. 154(b) by 385 days.

(21) Appl. No.: 11/792,416

(22) PCT Filed: Oct. 5, 2006

(86) PCT No.: PCT/IB2006/002768

§ 371 (c)(1),
(2), (4) Date: Jun. 6, 2007

(87) PCT Pub. No.: WO2007/045950

PCT Pub. Date: Apr. 26, 2007

(65) Prior Publication Data

US 2009/0244476 A1 Oct. 1, 2009

Related U.S. Application Data

(60) Provisional application No. 60/730,840, filed on Oct. 28, 2005.

(30) Foreign Application Priority Data

Oct. 21, 2005 (FR) .................................. 05 10753

(51) Int. Cl.
G02C 1/08 (2006.01)

(52) U.S. Cl. ............................ 351/97; 351/92; 351/121

(58) Field of Classification Search .................. 351/41, 351/90–102, 153, 111, 119, 121; 16/228
See application file for complete search history.

(56) References Cited

U.S. PATENT DOCUMENTS 5,940,164 A * 8/1999 Deppi ......................... 351/95
6,273,564 B1 8/2001 Wedeck et al.

FOREIGN PATENT DOCUMENTS

| DE | 12 96 821 | 6/1969 |
| EP | 0 470 316 | 2/1992 |
| FR | 2606169 | 5/1988 |

* cited by examiner

Primary Examiner—Huy K Mai
(74) Attorney, Agent, or Firm—Young & Thompson

(57) ABSTRACT

Each lens frame includes a slit at the assembly area of the corresponding temple, delimiting two independent which can be moved apart to widen the lens frame so that a lens can be inserted or removed. Each temple is connected to the corresponding lens frame by a tenon, including a first part connected to the temple, for making a rotating connection between the tenon and temple along the longitudinal axis of the temple, and a second pivotable part engaged between the portions of the lens frame. This second part, has a first dimension that can be in a first angular position of the tenon, in which the two portions, are not separated, and a second dimension in a second angular position of the tenon, in which the two portions are separated sufficiently to widen the lens frame so that the lens can be replaced.

13 Claims, 2 Drawing Sheets

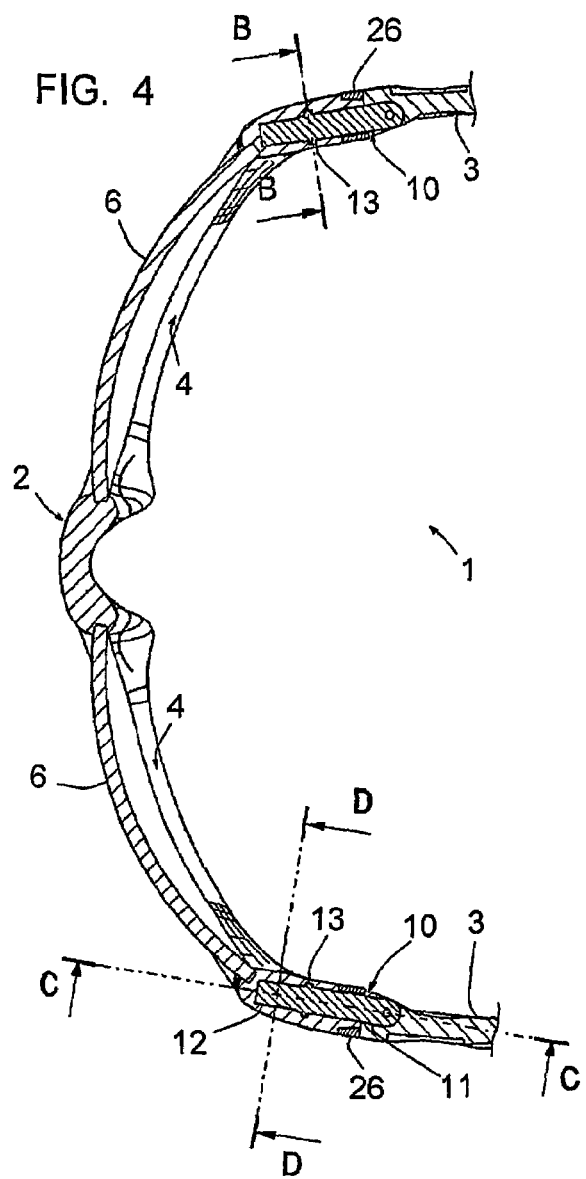
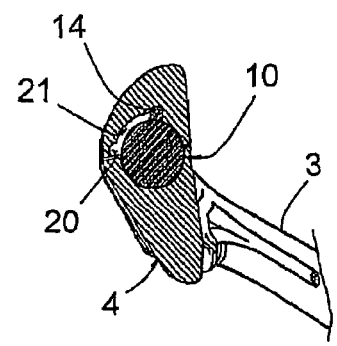
FIG. 5
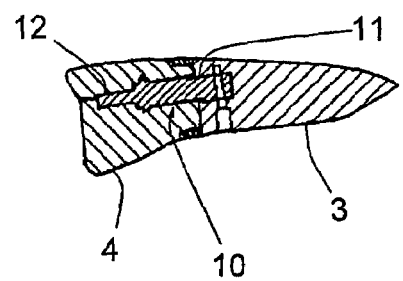
FIG. 6
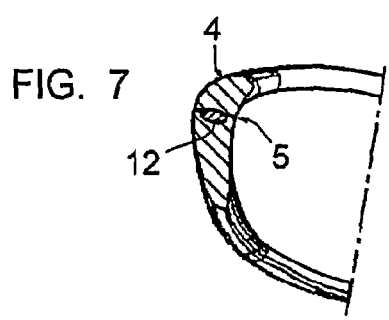
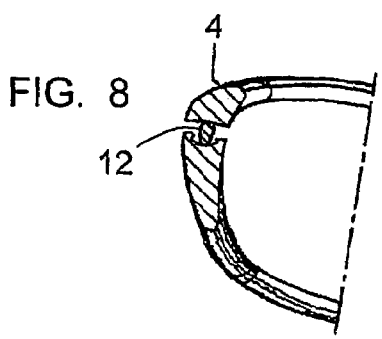

PAIR OF SPECTACLES WITH INTERCHANGEABLE LENSES

This invention relates to a pair of spectacles with interchangeable lenses.

There are many systems that can be used to replace the lenses in a pair of spectacles, for example to replace prescription lenses with sunglasses, or sunglasses with anti-fog glasses.

However, existing systems are not perfectly satisfactory since they are not very practical to use, not very reliable in their operation, not very aesthetic, and/or expensive to make.

This invention is designed to correct this disadvantage by providing a pair of spectacles with interchangeable lenses that enables fast and easy replacement of the lenses and also reliable support for the lenses in the frame, namely with no risk of the lenses being accidentally released, while maintaining a good visual appearance and being relatively inexpensive to make.

To achieve this, in the pair of spectacles according to the invention,

- each lens frame includes a slit at the assembly area of the corresponding temple, this slit extending from the inside of the lens frame to the outside and thus delimiting two independent portions of the lens frame, it being possible to move these two portions apart to widen the lens frame so that a lens can be inserted or removed; and
- each temple is connected to the corresponding lens frame by means of a tenon, this tenon comprising a first part connected to the temple used to make a rotating connection between the tenon and the temple along the general longitudinal axis of the temple, and a second part engaged between the said portions of the lens frame with the possibility of pivoting, this second part having two dimensions in directions perpendicular to its pivot axis, namely a first dimension that can be in a first angular position of the tenon in which the two portions of the lens frame are not separated, and a second dimension in a second angular position of the tenon in which the two portions of the lens frame are separated sufficiently to widen the lens frame so that the lens can be replaced.

When the pair of spectacles is being worn, each tenon is in said first position and the lens frame supports the lens reliably; when the user wants to replace a lens, he pivots the corresponding temple about the general longitudinal axis of this temple, and pivots the tenon between said first position and said second position; in this second position, said lens portions are separated, so that the lens can be interchanged; once this replacement has been made, the temple is used to bring the tenon back into its normal position, so that the lens frame once again grips the lens and holds it firmly in place.

Advantageously, said second part of the tenon fits into a housing with a shape corresponding to it, defined jointly by said portions of the lens frame, this housing being such that adjacent faces of the two portions of the lens frame are in the immediate vicinity of each other when said second part is in said first position.

The slit delimiting the two lens frame portions is thus hardly visible, such that the visual appearance of the pair of spectacles is pleasing.

Preferably,

- the tenon comprises at least one projecting portion for example in the form of a collar with in the same direction as the direction of said second dimension of said second part, greater than this second dimension, and
- said portions of the lens frame comprise a housing in which this said projecting portion fits and is retained.

The temple is assembled to the lens frame by separating said portions of the lens frame so that said projecting portion can fit into said housing, and by engaging this projecting portion into this housing. Considering the above mentioned dimensions of this projecting portion and said second part in said second dimension, pivoting of the tenon into said second position does not separate the two lens frame portions sufficiently so that said projecting portion can be extracted from said housing.

It is thus particularly easy and fast to assemble the temple to the lens frame.

Preferably, the tenon and said lens frame portions comprise means of holding the tenon in said first position and/or in said second position.

Advantageously, the tenon and said portions of the lens frame comprise means of limiting pivoting of the tenon between said first and said second positions.

The user can thus easily find these positions.

According to one preferred embodiment of the invention to form said support means and/or said limitation means,

- the tenon comprises a radial pin, and
- one of the portions of the lens frame comprises two cavities offset from each other at different angles and into which this pin can fit, and a groove portion extending between these cavities inside which the pin can move while the tenon is being pivoted.

The walls of the portion of lens frames delimiting the cavities act as stops that cooperate with the pin to limit pivoting of the tenon between said first and second positions.

The invention will be clearly understood and other characteristics and advantages of it will become clearer with reference to the appended diagrammatic drawing showing one preferred embodiment of a pair of spectacles according to the invention shown as a non-limitative example.

FIG. 4 is a sectional view through the centre lines of the two tenons in the figure, and FIGS. 5 to 8 are sectional views at larger scale showing lines B-B, C-C and D-D in FIG. 4.

Figure 1:
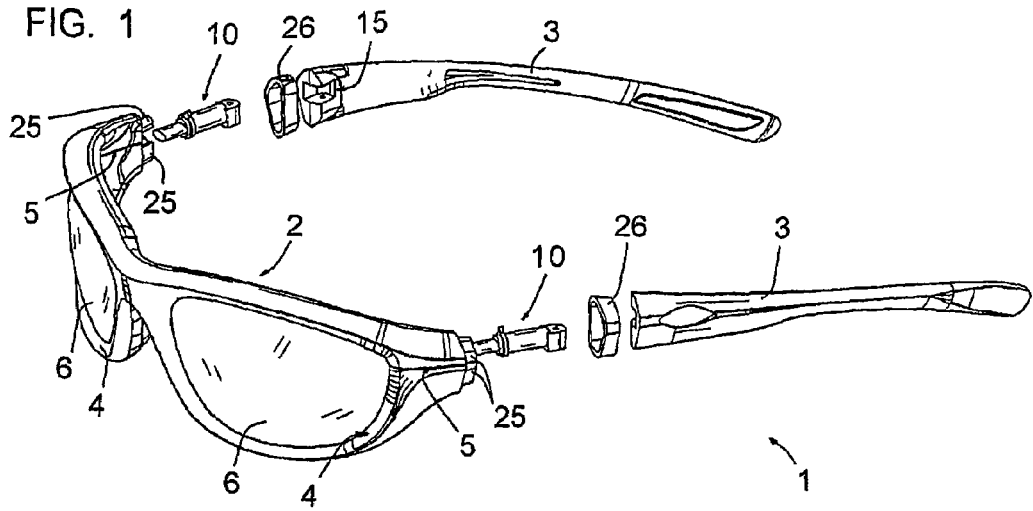
FIG. 1 is an exploded perspective view.
Figure 2:
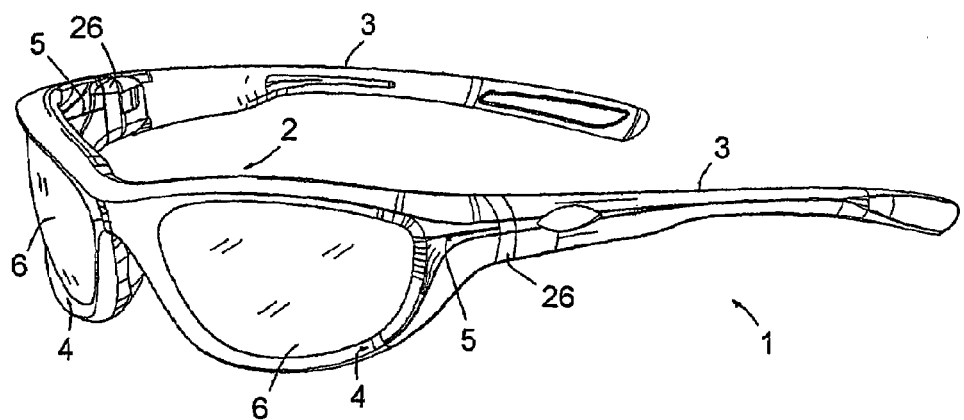
FIG. 2 is an assembled perspective view.

FIGS. 1 and 2 show a pair of spectacles 1, conventionally comprising a frame 2 and two pivoting temples 3.

Figure 3:
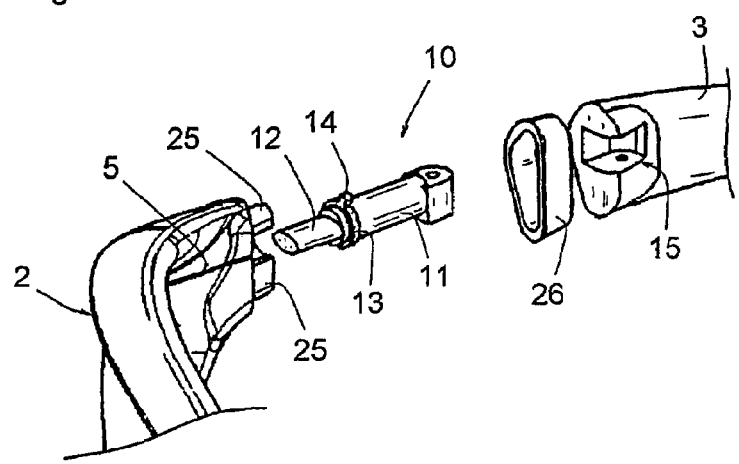
FIG. 3 is a partial view similar to that in FIG. 1 at a larger scale.

As shown on FIGS. 1-3, each lens frame 4 comprises a slit 5 at the assembly area of the corresponding temple 3, this slit 5 extending from the inside of the lens frame 4 to the outside, and thus delimiting two independent lens frame portions.

The material from which the frame 2 is made is slightly deformable elastically, such that the two portions can be separated from each other to widen the lens frame 4 so that a lens 6 can be inserted or removed.

The pair of spectacles 1 also comprises two tenons 10 used to assemble the temples 3 to the frame 2.

Each tenon 10 comprises a first part 11, a second part 12, a collar 13 and a radial pin 14.

The part 11 has a generally cylindrical shape and is terminated with a portion for assembly to the temple 3, through which a hole is drilled through which a hinge pin can be forced about which the temple 3 pivots between its unfolded and folded positions. The temple 3 comprises a cavity 15 into which this assembly portion fits with a rotational connection between the tenon 10 and the temple 3 about the general longitudinal axis of this temple 3. In the example shown, this rotating connection is made using upper and lower plane faces on said assembly portion and upper and lower plane faces delimiting said cavity 15, these corresponding plane faces coming into the immediate proximity of each other when the assembly portion is engaged in the cavity 15.

The part 12 is longitudinally in line with part 11 and has an oval-shaped cross-section.

The collar 13 is located between parts 11 and 12. Its diameter is larger than the width of part 12 and comprises the pin 14.

As shown on FIGS. 4 and 6, the two portions of the lens frame 4 delimit a housing adjusted to the tenon 10. However, this housing is such that the tenon 10 can pivot inside the housing.

FIG. 5 shows that the upper portion of the lens frame 4 at the collar 13 comprises two cavities 20 at different angles into which the pin 14 can fit, and a groove portion 21 extending between these cavities 20, in which the pin 14 can circulate when the tenon 10 pivots. As shown in FIG. 5, the cavities 20 are slightly deeper in the radial direction than the groove 21, consequently the two portions of the lens frame 4 will have to be moved slightly apart, such that there is a "hard point" to be passed to make the pin 14 pass from a cavity 20 to the groove 21.

Each lens frame 4 also forms studs 25 into which an aesthetic finishing ring 26 fits, at its assembly interface to the corresponding temple 3.

A temple 3 is assembled to the frame 2 by separating said portions of the lens frame 4 so that the tenon 10 will fit into the corresponding housing, and particularly the collar 13 fits into the housing formed to hold it. The force separating the portions of the lens frame 4 is then released allowing elastic return so that these portions trap the tenon between them.

During normal use, the pair of spectacles 1 is as shown on FIG. 2. Each tenon 10 is then in the position shown in FIGS. 4 and 7, in which the lens frame 4 reliably holds the lens frame 6 in position and in which the portions of the lens frame 4 are immediately adjacent to each other at the slits 5, such that these slits 5 are hardly visible.

When the user wants to replace a lens 6, he pivots the corresponding temple 3 about the general longitudinal axis of this temple, which pivots the tenon 10 between the position shown on FIGS. 4 and 7 and the position shown on FIG. 8; in this second position, said portions of lens frame 4 are moved apart, so that the lens 6 can be replaced. This position can be found easily by the pin 14 fitting into one of the cavities 20.

Due to the diameter of the collar 13 that is larger than width of the part 12, pivoting of the tenon 10 into the position shown on FIG. 8 does not move the two portions of the lens frame 4 far enough apart to enable extraction of the collar 13 outside the housing into which it fits.

Once the lens 6 has been replaced, the tenon 10 returns to its normal position using the temple 3, that once again brings the lens frame 4 into its position to clamp the lens 6 and hold it firmly in position.

The temple 3 is stabilised in one of the two possible positions of this temple due to the above-mentioned "hard points" caused by the cavities 20 being deeper than the groove 21.

As is clear from the above, the invention provides a pair of spectacles with interchangeable lenses with important advantages that enable fast and easy replacement of the lenses 6 on the frame 2, in other words with no risk of the lenses being accidentally released, while providing an aesthetic appearance and being relatively inexpensive to make.

Obviously, the invention is not limited to the embodiment described above as an example, but it covers all embodiments covered by the appended claims.

The invention claimed is:

1. Pair of spectacles (1) with interchangeable lenses (6), characterised in that:

each lens frame (4) includes a slit (5) at the assembly area of the corresponding temple (3), the slit (5) extending from the inside of the lens frame (4) to the outside and thus delimiting two independent portions of the lens frame, it being possible to move the two portions apart to widen the lens frame (4) so that a lens (6) can be inserted or removed; and each temple (3) is connected to the corresponding lens frame (4) by means of a tenon (10), the tenon (10) comprising a first part (11) connected to the temple (3), used to make a rotating connection between the tenon (10) and the temple (3) along the general longitudinal axis of the temple (3), and a second part (12) engaged between the said lens frame (4) portions with the possibility of pivoting, the second part (12) having two dimensions in directions perpendicular to its pivot axis, namely a first dimension that can be in a first angular position of the tenon (10), in which the two portions of the lens frame (4), are not separated, and a second dimension in a second angular position of the tenon (10), in which the two portions of the lens frame (4) are separated sufficiently to widen the lens frame (4) so that the lens (6) can be replaced.

2. Pair of spectacles (1) set forth in claim 1, characterised in that said second part (12) of the tenon (10) fits into a housing with a shape corresponding to it, defined jointly by said portions of the lens frame (4), the housing being such that adjacent faces of the two portions of the lens frame (4) are in the immediate vicinity of each other when said second part (12) is in said first position.

3. Pair of spectacles (1) set forth in claim 2, characterised in that:

the tenon (10) comprises at least one projecting portion (13), and said portions of the lens frame (4) comprise a housing in which the said projecting portion (13) fits and is retained.

4. Pair of spectacles (1) set forth in claim 2, characterised in that the tenon (10) and said portions of the lens frame (4) comprise means (14, 20, 21) of holding the tenon (10) in said first position and/or in said second position.

5. Pair of spectacles (1) set forth in claim 2, characterised in that the tenon (10) and said portions of the lens frame (4) comprise means (14, 20, 21) of limiting pivoting of the tenon (10) between said first and said second positions.

6. Pair of spectacles (1) set forth in claim 1, characterised in that:

the tenon (10) comprises at least one projecting portion (13), in the form of a collar with in the same direction as the direction of said second dimension of said second part (12), greater than the second dimension, and said portions of the lens frame (4) comprise a housing in which the said projecting portion (13) fits and is retained.

7. Pair of spectacles (1) set forth in claim 6, characterised in that the tenon (10) and said portions of the lens frame (4) comprise means (14, 20, 21) of holding the tenon (10) in said first position and/or in said second position.

8. Pair of spectacles (1) set forth in claim 6, characterised in that the tenon (10) and said portions of the lens frame (4) comprise means (14, 20, 21) of limiting pivoting of the tenon (10) between said first and said second positions.

9. Pair of spectacles (1) set forth in claim 1, characterised in that the tenon (10) and said portions of the lens frame (4) comprise means (14, 20, 21) of holding the tenon (10) in said first position and/or in said second position.

10. Pair of spectacles (1) set forth in claim 9, characterised in that:

the tenon (10) comprises a radial pin (14), and one of the portions of the lens frame (4) comprises two cavities (20) offset from each other at different angles and into which the pin (14) can fit, and a groove portion (21) extending between the cavities (20), inside which the pin (14) can move while the tenon (10) is being pivoted.

11. Pair of spectacles (1) set forth in claim 9, characterised in that the tenon (10) and said portions of the lens frame (4) comprise means (14, 20, 21) of limiting pivoting of the tenon (10) between said first and said second positions.

12. Pair of spectacles (1) set forth in claim 1, characterised in that the tenon (10) and said portions of the lens frame (4) comprise means (14, 20, 21) of limiting pivoting of the tenon (10) between said first and said second positions.

13. Pair of spectacles (1) set forth in claim 12, characterised in that:

the tenon (10) comprises a radial pin (14), and one of the portions of the lens frame (4) comprises two cavities (20) offset from each other at different angles and into which the pin (14) can fit, and a groove portion (21) extending between the cavities (20), inside which the pin (14) can move while the tenon (10) is being pivoted.

\* \* \* \* \*